Sept. 2, 1952     R. D. GAMBRILL     2,608,854
APPARATUS FOR TESTING CONNECTORS FOR LEAKAGE
Filed April 23, 1946                       5 Sheets-Sheet 3
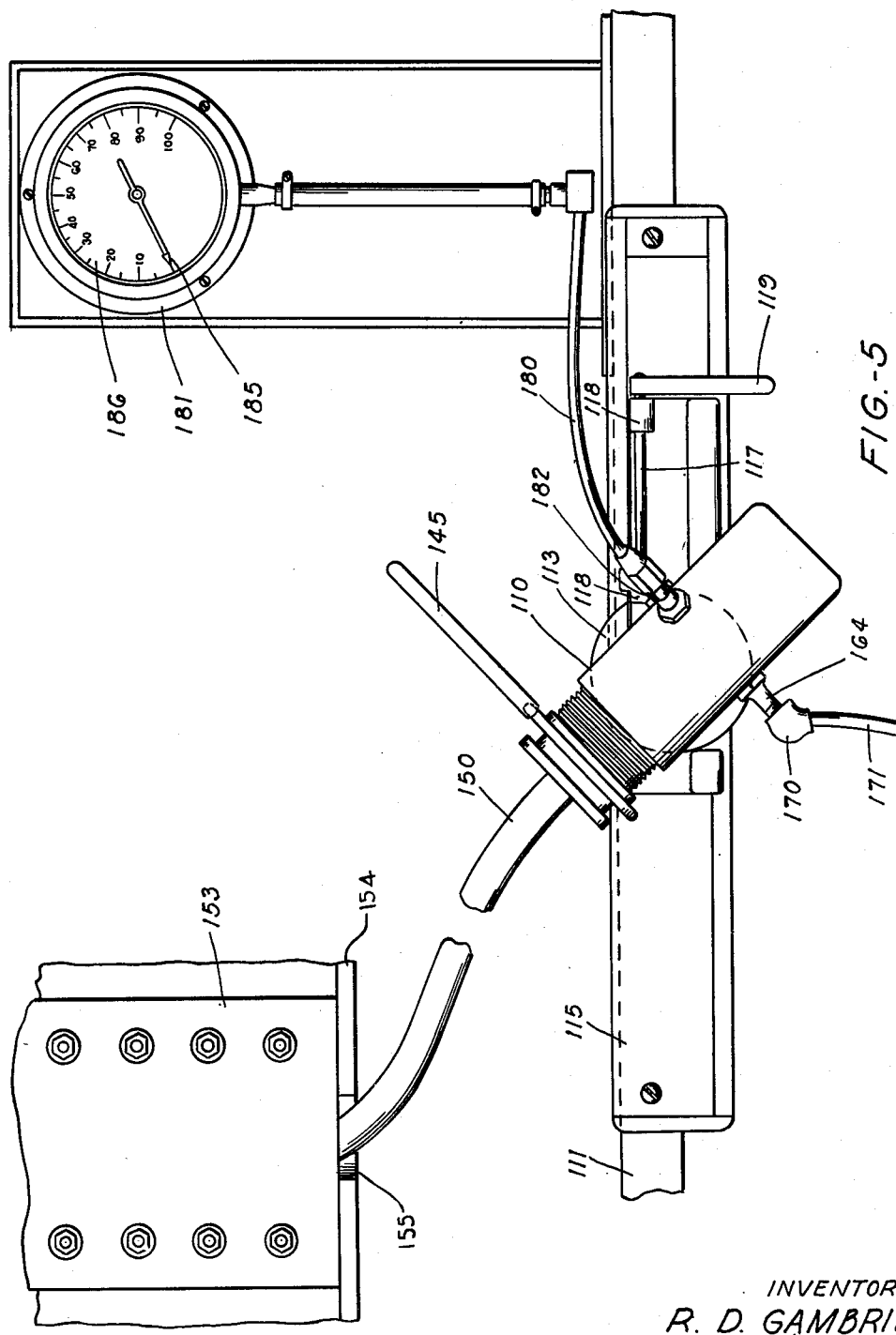
INVENTOR
R. D. GAMBRILL
BY
ATTORNEY Sept. 2, 1952 R. D. GAMBRILL 2,608,854
APPARATUS FOR TESTING CONNECTORS FOR LEAKAGE
Filed April 23, 1946 5 Sheets-Sheet 4
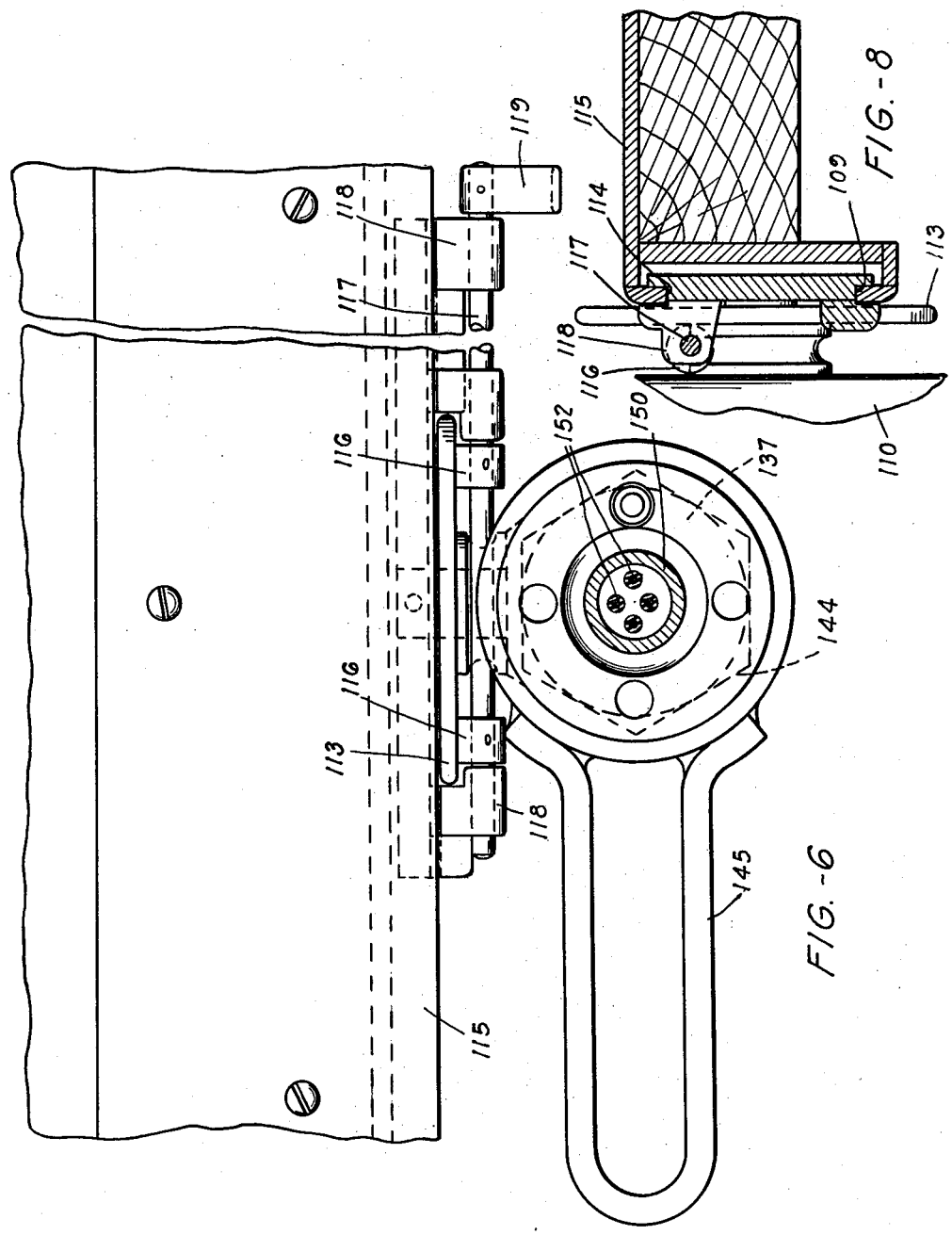
INVENTOR
R. D. GAMBRILL
BY
ATTORNEY Sept. 2, 1952      R. D. GAMBRILL      2,608,854
APPARATUS FOR TESTING CONNECTORS FOR LEAKAGE
Filed April 23, 1946      5 Sheets-Sheet 5

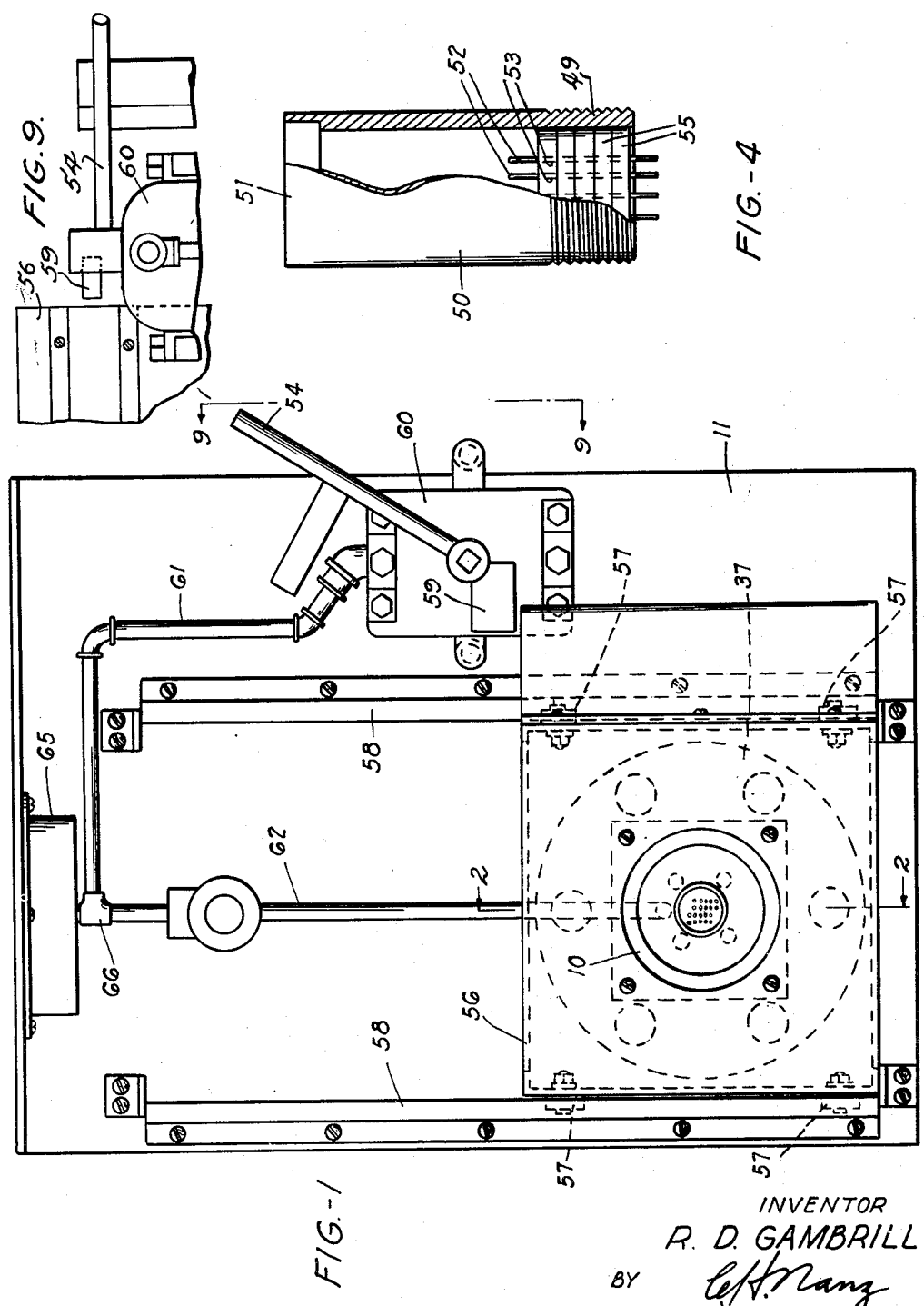

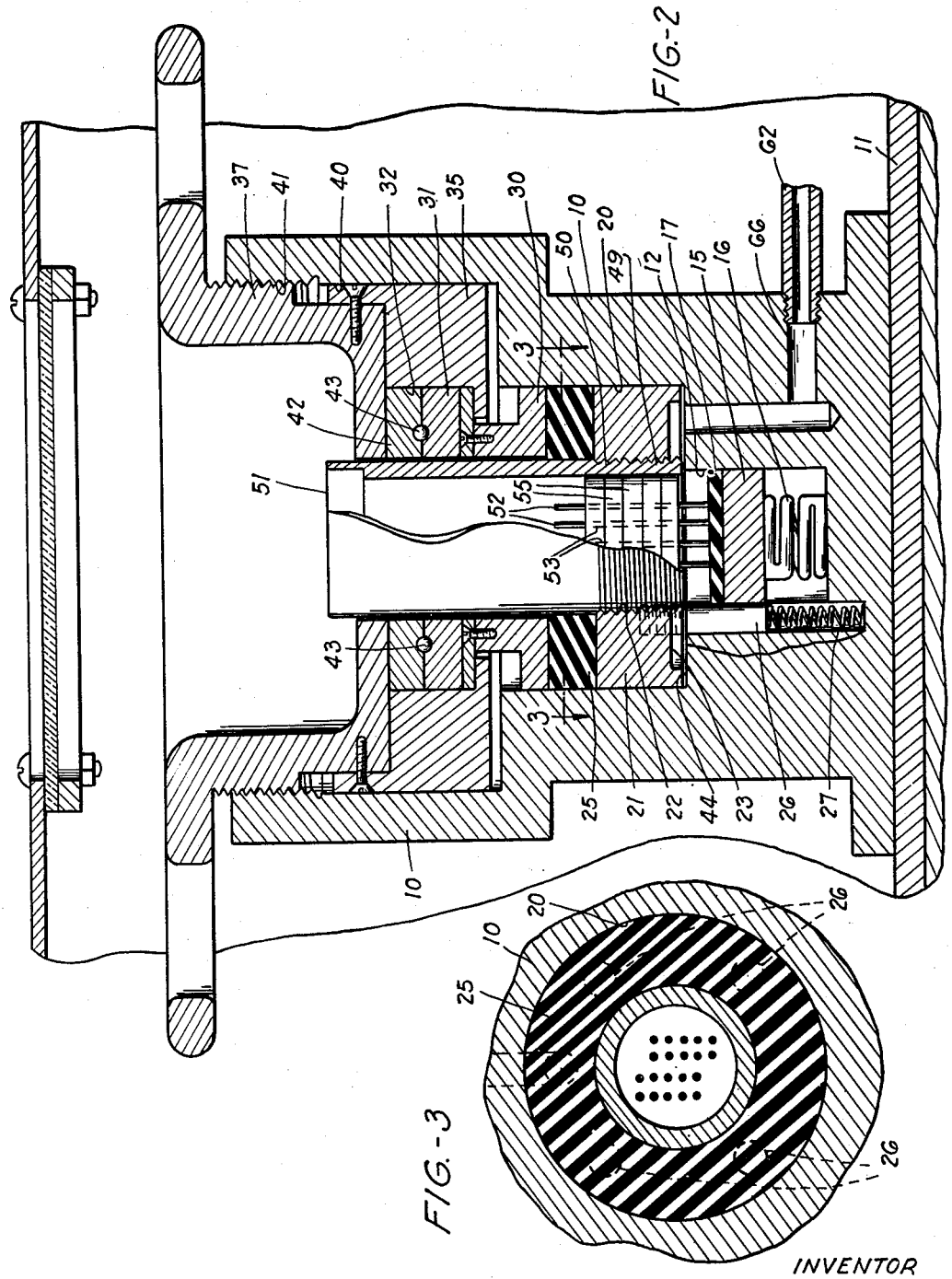

INVENTOR
R. D. GAMBRILL
BY
ATTORNEY

Patented Sept. 2, 1952

2,608,854

UNITED STATES PATENT OFFICE 2,608,854

APPARATUS FOR TESTING CONNECTORS FOR LEAKAGE

Richard D. Gambrill, Baltimore, Md., assignor to Western Electric Company, Incorporated, New York, N. Y., a corporation of New York Application April 23, 1946, Serial No. 664,159

7 Claims. (Cl. 73—40)

This invention relates to an apparatus for testing articles for leakage, and more particularly to apparatus for testing supposedly pressure-tight conduits such as connectors.

An object of the invention is to provide new and improved apparatus for testing articles for leakage.

Another object of the invention is to provide new and improved apparatus for testing supposedly pressure-tight articles, such as hollow conduits or connectors to determine whether such articles are free of leaks.

An apparatus forming a specific embodiment of the invention includes a container having an opening therein for receiving an end of a pressure-tight article to be tested. An elastic ring, which is highly resistant to deformation is positioned around an article inserted through the opening in the container and may be pressed around the article to seal the article in the container and to leave one end of the article free to the atmosphere surrounding the container. A gas under high pressure is introduced into the container and a pressure gauge registers the difference between the pressure of the gas in the container and that of the atmosphere. If the article has any leaks therein, the gas in the container will escape therethrough into the atmosphere and the gauge will indicate that gas is escaping from the container.

A complete understanding of the invention may be obtained from the following detailed description of the apparatus forming specific embodiments thereof, when read in conjunction with the appended drawings, in which:

Fig. 1 is a top plan view of an apparatus forming one embodiment of the invention;

Fig. 2 is an enlarged, fragmentary, vertical section taken along line 2—2 of Fig. 1;

Fig. 3 is an enlarged, fragmentary, horizontal section taken along line 3—3 of Fig. 2;

Fig. 4 is a partially, sectional view of a connector to be tested by the apparatus shown in Fig. 2;

Fig. 5 is a fragmentary, front elevation of an apparatus forming a second embodiment of the invention;

Fig. 6 is a fragmentary, top plan view of a portion of the apparatus shown in Fig. 5;

Fig. 8 is a fragmentary, vertical section taken along line 8—8 of Fig. 7, and

Fig. 9 is a fragmentary, vertical section taken along line 9—9 of Fig. 1.

Figure 7:
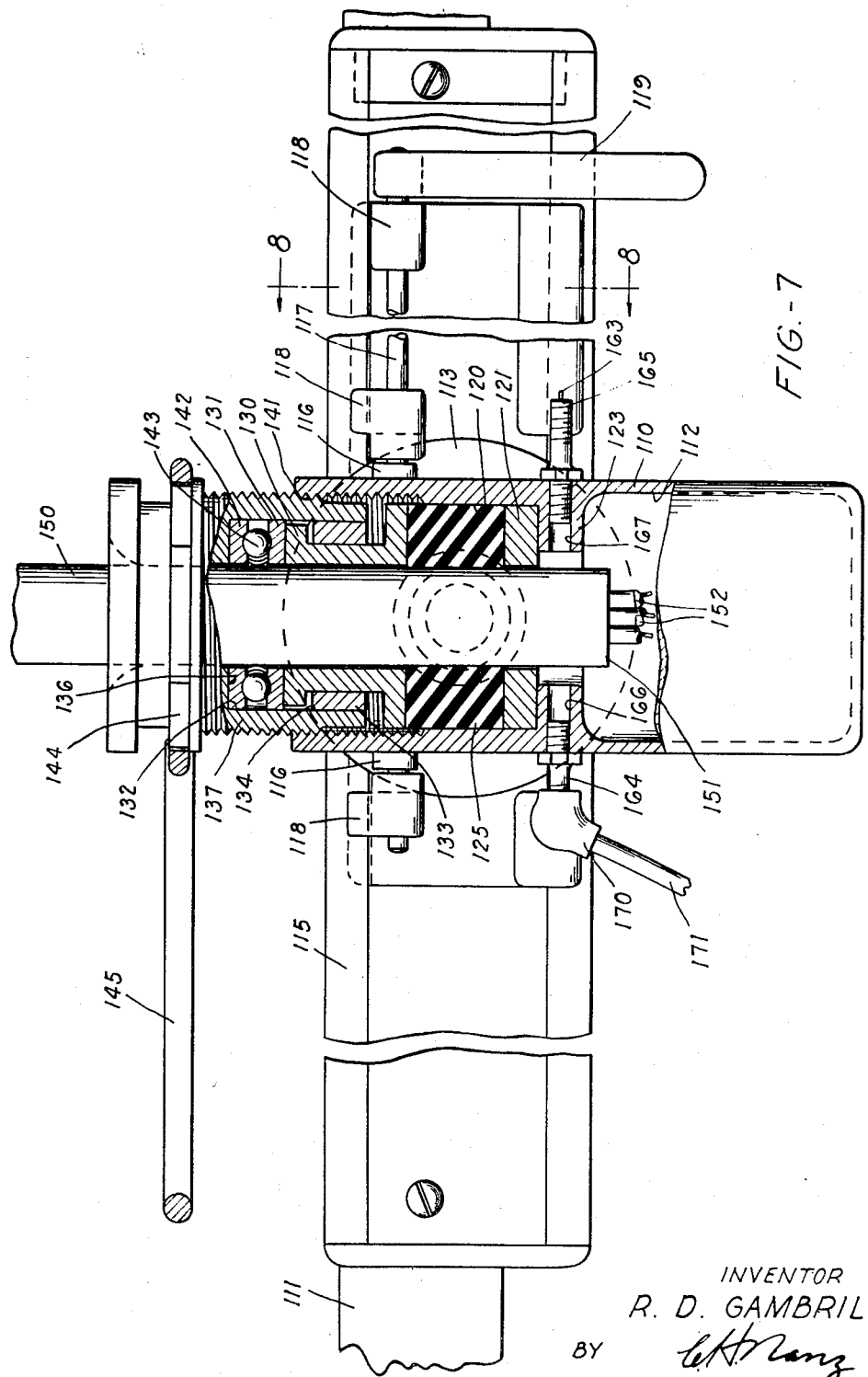
Fig. 7 is a fragmentary, front elevation of a portion of the apparatus shown in Fig. 5 with portions thereof shown in section.

Referring now in detail to the drawings, a cylindrical container 10 (Figs. 1 and 3) mounted securely on a bench 11 is provided with a chamber 12 in which is slidably mounted a seat 15. The seat 15 is supported by a compression spring 16, and supports a gasket 17 on the top thereof, as viewed in Fig. 3, which is composed of a highly elastic material, such as a vulcanized rubber or rubber-like compound. The container 10 is also provided with a counterbore 20 in which is mounted an annular nut 21 having a threaded portion 22 and an annular passage 23. A thick sealing ring 25 formed of a highly elastic material, which is highly resistant to compression, such as a vulcanized rubber or rubber-like compound, and supported on the nut 21 is urged upwardly, as viewed in Fig. 2, by spring-pressed plungers 26—26 (Figs. 2 and 3), which are urged upwardly, as viewed in Fig. 2, by compression springs, of which a compression spring 27 (Fig. 2) is shown.

An annular presser 30 fitted slidably in the counterbore 20 is fastened to a bearing race 31, which is mounted in a groove 32 formed by an annular retainer 35 and an annular plug 37. The plug 37 and the annular retainer 35 may be rotated in a second counterbore 40 formed in the container 10, and the plug 37 may be screwed into a tapped portion 41 of the counterbore 40. When the plug 37 is threaded farther into the counterbore 40, it presses an upper race 42 downwardly against ball bearings 43—43 and forces the lower race 31 downwardly, which thrusts the annular presser 30 downwardly and moves the sealing ring 25 and the annular nut 21 downwardly against the action of the compression springs 27—27 until the nut 21 stops against a shoulder 44 of the container 10. This presses the sealing ring 25 tightly against the walls of the counterbore 20 in the container 10 and tightly against a tube 50 of a connector 51 having threaded end portion 49, which is screwed into the annular nut 21. The connector 51 includes a plurality of tubes 52—52 extending through holes 53—53 formed in sealing and insulating discs 55—55 fitting tightly within the tube 50. The discs are intended to seal the end of the connector except for the passages in the tubes 52—52.

When the connector 51 is threaded into the nut 21, the springs 27—27 hold the nut 21 in a raised position so that the tubes 52—52 do not touch the gasket 17 when the connector 51 is screwed into the nut 21. After the connector is screwed into the nut 21, the sealing ring 25 is urged downwardly, as described hereinabove to force the lower ends of the tubes 52—52 against the gasket 17, which seals the tubes 52—52 from the chamber 12 in the container 10. When the annular nut 21 is moved downwardly, as described hereinabove, the tubes 52—52 engage the gasket 17 and, through the gasket 17, move the support 15 downwardly against the action of the compression spring 16 so that the gasket 17 is forced tightly against the ends of the tubes 52—52. The plungers 26—26 prevent rotation of the annular nut 21.

After the end of the connector 51 has been sealed by the sealing ring 25 and the gasket 17, a small quantity of alcohol is placed in the upper portion of the tube 50, and a protective cover 56 (Fig. 1) mounted on rollers 57—57 movable in grooved guides 58—58 is moved along the guides 58—58 from a position behind the plug 37, as viewed in Fig. 1, to a position covering the plug 37. Before the cover is so moved it is in the path of a lug 59 secured rigidly to a handle 54 of a valve 60 and prevents opening the valve. After the cover is moved over the plug 37, the handle 54 and the lug 59 may be and are turned in a clockwise direction, as viewed in Fig. 1, to admit nitrogen gas under a pressure of about 300 pounds per square inch to a pipe 61, which leads to a pipe 62 connected at one end thereof to a pressure gauge 65 and at the other end thereof to an L-shaped passage 66. The passage 66 is connected to the annular passage 23 formed in the annular nut 21 so that the portion of the chamber 12 above the gasket 17 is filled with nitrgogen under a pressure much higher than that of the atmosphere. The pressure of the gas is exerted upon the sealing discs 55—55 and also upon the joints between the sealing discs and the tube 50 and the joints between the sealing discs and the tubes 52—52. The valve 60 then is closed, and if there are any leaks in the connector 51 between the tubes 52—52 and the holes 53—53, or between the discs 55—55 and the tube 50, the gas will escape into the atmosphere, which fact will be indicated by the pressure gauge 65 and by bubbles in the alcohol.

In the operation of the apparatus described hereinabove, the connector 51 is threaded into the annular nut 21, and the plug 37 is threaded into the threaded portion 41 of the counterbore 40 in the container 10, to force the ends of the tube 52—52 tightly against the gasket 17 to seal them from the chamber 12 and to press the thick sealing ring 25 to seal the chamber 12 and the counterbore 20 in the container 10 from the atmosphere. The sealing ring 25 also is pressed into sealing engagement with the tube 50 of the connector 51. Alcohol then is poured into the upper end of the tube 50 and the cover 56 is closed.

The valve 60 (Fig. 1) then is opened and nitrogen gas under high pressure is supplied to the chamber 12 and the counterbore 20 in the container. The valve then is reclosed to shut off the gas supply. The pressure on the gas in the chamber 12 is indicated constantly by the pressure gauge 65 and if the pressure in the container 10 does not decrease, the connector 51 is pressure tight. However, if there are any leaks in the connector 51, gas will escape from the container 10 into the atmosphere, which fact will be indicated by the gauge 65 and the connector may be rejected. The alcohol facilitates the detection and location of slow leaks in the connector 51, which cause bubbles in the alcohol and thereby indicate the presence and location of such leaks.

The above-described apparatus tests articles, such as the connector 51, severely. The connectors may be inserted into the apparatus and removed therefrom very quickly and easily so that a large number of such connectors may be tested within a very short period of time. The interlock between the valve 60 and the cover 56 prevents any danger in the operation of the apparatus, and prevents opening of the valve 60 when the cover is not in its closed position An apparatus forming a second embodiment of the invention is disclosed in Figs. 5 to 8, inclusive, and includes a container 110 having chambers 112 and 120 formed therein, which are separated by an annular ring portion 123 formed on the interior of the container 110. The container 110 is rigidly fastened to a disc 113 (Fig. 8) having a groove 109 formed therein, into which groove an annular flange 114 of a support 115 fastened to a bench 111 fits. The disc 113 may be turned relative to the annular flange 114 of the support to adjust the position of the container 110 with respect to the support 115. When the container 110 is in its desired position, a shaft 117 (Fig. 6) mounted in bearings 118—118 is turned through a handle 119, and turns eccentric cams 116—116 into locking engagement with the disc 113 to secure the container 110 in its adjusted position.

A backing washer 121 (Fig. 7) fits into the chamber 120 in the container 110, and is supported by the ring portion 123 of the container 110. A thick sealing ring 125 composed of a solid, highly elastic material, which is highly resistant to compression, such as a vulcanized rubber or rubber-like material, is positioned between the backing washer 121 and a thrust collar 130 positioned above the sealing ring 125. The thrust collar 130 abuts a thrust bearing race 131 positioned in a socket 132 formed in an annular, threaded plug 137, and is secured rotatably therein by a bushing 133.

When the plug 137 is screwed into a threaded portion 141 in the upper end of the container 110, as viewed in Fig. 7, a face 136 of the socket 132 forces a thrust bearing race 142 downwardly to force balls 143—143 downwardly against the race 131. The plug 137 may be screwed into the threaded portion 141 of the container 110 by a wrench 145 fitting over a nut portion 144 of the plug 137. When the plug 137 is threaded farther into the container 110, the collar 130 is forced downwardly and presses the sealing ring 125 between the collar 130 and the backing washer 121 This forces the sealing ring 125 tightly around a conduit 150, through which conductors 152—152 pass and which has an open end 151 projecting through the plug 137, the races 142 and 131, the collar 130, the sealing ring 125 and the backing washer 121, to form a pressure-tight seal therewith. The sealing ring 125 also is forced tightly against the wall of the chamber 120 of the container 110 and forms a pressure-tight seal therewith. The conduit 150 is connected to a supposedly gas-tight connector box 153 (Fig. 5), which is supported by a shelf 154 having a notch 155 to provide clearance for the conduit 150.

Valve stems 164 and 165 (Fig. 7) are threaded into tapped passages 166 and 167, respectively, formed in the ring portion 123, and have one-way valves, of which a one-way valve 163 is shown, threaded into the ends thereof. After the open end 151 of the conduit 150 has been sealed in the container 110, as described hereinabove, a nozzle 170 on a supply hose 171 leading to a supply of gas under pressure is placed over whichever one of the valve stems 164 and 165 is most convenient, and the chamber 112 in the container 110 is filled with gas under pressure. This also fills the conduit 150 and the supposedly gas-tight connector box 153 (Fig. 5), to which conduit 150 extends, with gas under pressure. The hose then is removed, leaving the chamber 112, the conduit 150 and the connector box 153 filled with gas under pressure.

A hose 180 (Fig. 5) connects a pressure gauge 181 to a conduit 182, which is in communication with the chamber 112 in the container 110. A pointer 185 of the gauge 181 indicates on a dial 186 of the gauge 181 the pressure of the gas in the chamber 112. If the conduit 150 and the connector box 153 have no leaks therein, the reading of the gauge 181 will remain constant, but if there is a leak in the conduit 150 or the connector box 153, gas will escape therethrough from the chamber 112 in the container 110 and the pressure of the gas in the chamber 112 will be reduced. This fact will be indicated by a lowering of the reading of the gauge 181 so that an operator will be apprised of the fact that the connector box or conduit has a leak therein and may locate the leak.

In the operation of the last-described apparatus, the connector box 153 is placed upon the shelf 154. The container 110 and the disc 113 are rotated to their positions shown in Fig. 5 and are locked in those positions by actuation of the handle 119, which turns the shaft 117 to force the eccentric cams 116—116 (Fig. 7) into gripping engagement with the disc 113. The open end 151 of the conduit 150 then is thrust through the annular plug 137, the bearing races 142 and 131, the annular collar 130, the sealing ring 125 and the backing washer 121. The wrench 145 is actuated to screw the plug 137 into the container 110 until the sealing ring 125 is pressed tightly enough against the wall of the chamber 120 in the container 110 and the outer periphery of the conduit 150 to seal the open end 151 of the conduit 150 in the chamber 112.

The nozzle 170 then is placed over the end of the valve stem 164, which valve stem is the most convenient when the container 110 is in the position shown in Fig. 5 and gas under pressure is forced into the chamber 112, the interior of the conduit 150 and the interior of the connector box 153. The gas is supplied through the nozzle 170 and the valve stem 164 until its pressure in the connector box and the conduit reaches the desired testing pressure, which will be indicated by the reading of the pointer 185 on the dial 186 of the gauge 181. The nozzle 170 then is removed from the valve stem 164. If the conduit 150 and the connector box 153 have no leaks therein, the reading of the pointer 185 on the dial 186 will remain constant. If there is a leak in either of the connector box 153 or the conduit 150, the gas pressure in the container 110 will fall off, which fact will be indicated by movement of the pointer 185 relative to the dial 186 and an operator of the apparatus may locate the leak in the terminal box and conduit under test.

The last-described apparatus serves to test fluid-containing articles under high pressures very accurately. The articles may be completely sealed in the container 110 and tested with a minimum of effort and time.

What is claimed is:

1. An apparatus for testing for leakage an article having a tube projecting beyond one end thereof, which comprises a container having an opening in one end thereof, an abutment resiliently supported within the container and adapted to engage the article under test, an elastic sealing member positioned upon the abutment and adapted to be compressed to grip in sealing engagement the periphery of the article under test, a gasket positioned below the abutment and adapted to seal the tube projecting beyond the end of the article when the sealing member is compressed, a plug adapted to be locked into the opening in the container and to compress the sealing member against the abutment, means for introducing gas under pressure into the container between the gasket and the sealing member, and means for indicating leakage into the article of the gas within the container.

2. An apparatus for testing for leakage an article having a threaded end portion and having a projecting tube sealed in that end, which comprises a container having a threaded opening, an annular abutment resiliently supported in the interior of the container and having a threaded portion adapted to engage the threaded portion of the article under test, an elastic sealing ring positioned upon the annular abutment and adapted to be compressed to grip in sealing engagement the periphery of the article under test, a gasket positioned below the abutment and adapted to seal the projecting tube when the sealing ring is compressed, an annular thrust bearing positioned above the sealing ring, an annular threaded plug adapted to be threaded into the opening of the container and to compress the sealing ring between the thrust bearing and the abutment, means for introducing gas under pressure into the container between the gasket and the sealing ring, and means for indicating leakage into the article of the gas within the container.

3. An apparatus for testing for leakage a connector having a plurality of longitudinal tubes projecting beyond one end thereof, which comprises a container having an opening in one end thereof, an abutment supported in the interior of the container and adapted to engage the connector under test, an elastic sealing member positioned upon the abutment and adapted to be compressed to grip in sealing engagement the periphery of the connector under test, a gasket positioned below the abutment and adapted to seal the ends of the tubes projecting beyond the end of the connector when the sealing member is compressed, a plug adapted to be locked into the opening in the container and to compress the sealing member against the abutment, means for introducing gas under pressure into the container between the gasket and the sealing member, and means for indicating leakage into the connector of the gas within the container.

4. An apparatus for testing for leakage a connector having a plurality of longitudinal tubes projecting beyond one end thereof, which comprises a container having a threaded opening, an annular abutment resiliently supported in the interior of the container and adapted to engage the connector under test, an elastic sealing ring positioned upon the annular abutment and adapted to be compressed to grip in sealing engagement the periphery of the connector under test, a gasket positioned below the abutment and adapted to seal the ends of the tubes projecting beyond the connector under test when the sealing ring is compressed, an annular threaded plug adapted to be threaded into the opening in the container and to compress the sealing ring against the abutment, means for introducing gas under pressure into the container between the gasket and the sealing ring, and means for indicating leakage into the connector of the gas within the container.

5. An apparatus for testing for leakage a connector having a threaded end portion and having a plurality of longitudinal tubes projecting beyond that end, which comprises a container having a chamber communicating with a counterbore forming an interior annular shoulder therein, an annular nut mounted within the counterbore above the shoulder and having a threaded portion adapted to engage the threaded portion of the connector under test, an elastic sealing ring positioned upon the annular nut and adapted to be compressed to grip in sealing engagement the periphery of the connector under test, a gasket positioned below the shoulder and adapted to seal the ends of the tubes projecting beyond the connector under test when the sealing ring is compressed, resilient means for urging the gasket into sealing engagement with the tubes, an annular plug selectively positionable within the counterbore to compress the sealing ring against the nut thereby causing the ring to effect a seal with the periphery of the connector, means for introducing gas under pressure into the container between the gasket and the sealing ring, and means for indicating leakage into the connector of the gas within the container.

6. An apparatus for testing for leakage a connector having a threaded end portion and having a plurality of longitudinal tubes extending through and projecting beyond a sealing disc fitted within that end, which comprises a container having a chamber communicating with a counterbore forming an interior annular shoulder therein, an annular nut mounted within the counterbore above the shoulder and having a threaded portion adapted to engage the threaded portion of the connector under test, means for urging the nut away from the shoulder and for preventing any rotation of the nut, an elastic sealing ring positioned upon the annular nut and adapted to be compressed to grip in sealing engagement the periphery of the connector under test, a gasket positioned below the shoulder and adapted to seal the ends of the tubes projecting beyond the connector under test when the sealing ring is compressed, resilient means for urging the gasket into sealing engagement with the tubes, an annular thrust bearing positioned above the sealing ring, a second counterbore formed in the container and having a threaded portion, an annular threaded plug adapted to be threaded into the second counterbore of the container and to compress the sealing ring between the thrust bearing and the nut, means for introducing gas under pressure into the container between the gasket and the sealing ring, and means for indicating leakage through the disc into the connector of the gas within the container.

7. An apparatus for testing for leakage a connector having a threaded end portion and having a plurality of longitudinal tubes extending through and projecting beyond a sealing disc fitted within that end, which comprises a container having a chamber communicating with a counterbore forming an interior annular shoulder therein, an annular nut mounted within the counterbore above the shoulder and having a threaded portion adapted to engage the threaded portion of the connector under test, a plurality of spring-pressed plungers secured within the container below the shoulder and adapted to engage the nut to urge it away from the shoulder and to prevent any rotation of the nut, an elastic sealing ring positioned upon the annular nut and adapted to be compressed to grip in sealing engagement the periphery of the connector under test, a gasket positioned below the shoulder and adapted to seal the ends of the tubes projecting beyond the connector under test when the sealing ring is compressed, a spring-pressed seat slidably positioned within the chamber below the gasket for urging the gasket into sealing engagement with the tubes, an annular thrust bearing positioned above the sealing ring, a second counterbore formed in the container and having a threaded portion, an annular threaded plug adapted to be threaded into the second counterbore of the container and to compress the sealing ring between the thrust bearing and the nut, means including a valve for introducing gas under pressure into the chamber between the gasket and the sealing ring, a pressure gauge communicating with the chamber through the valve for indicating the pressure of the gas within the chamber, whereby a decrease in pressure may indicate leakage of gas through the disc and into the connector, a protective cover movable between a position covering the container and a position providing access to the container, and means for interlocking the valve with the cover to prevent the introduction of gas when the cover is in the position in which it provides access to the container.

RICHARD D. GAMBRILL.

REFERENCES CITED

The following references are of record in the file of this patent:

UNITED STATES PATENTS

| Number | Name | Date |
|---|---|---|
| 324,412 | Patterson | Aug. 18, 1885 |
| 372,491 | Saunders | Nov. 1, 1887 |
| 458,453 | Goodrich | Aug. 25, 1891 |
| 994,709 | Adams | June 13, 1911 |
| 1,529,874 | Culbertson | Mar. 17, 1925 |
| 2,060,388 | Whittle | Nov. 10, 1936 |
| 2,334,303 | Allen et al. | Nov. 16, 1943 |